July 23, 1957     D. W. RICHARDSON ET AL     2,800,564
SELF-CONTROLLED HEATING UNIT Filed Dec. 2, 1954.                           2 Sheets—Sheet 1

Inventors
DOUGLAS W. RICHARDSON
MALCOM R. SABISTON
By~ J. Richard Cavanagh

July 23, 1957 D. W. RICHARDSON ET AL 2,800,564
SELF-CONTROLLED HEATING UNIT
Filed Dec. 2, 1954 2 Sheets-Sheet 2
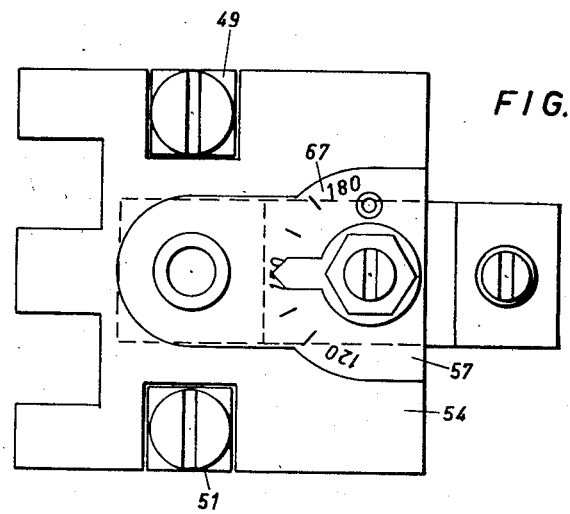
FIG. 3
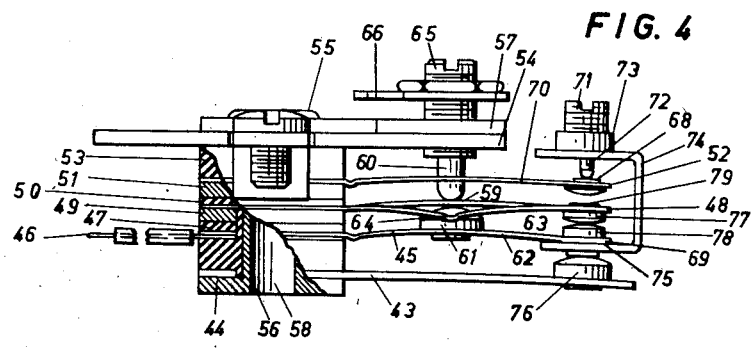
FIG. 4
FIG. 5
Inventors
DOUGLAS W. RICHARDSON
MALCOM R. SABISTON
By J. Richard Cavanagh

United States Patent Office

2,800,564
Patented July 23, 1957

2,800,564

SELF-CONTROLLED HEATING UNIT

Douglas William Richardson and Malcolm Rinaldo Sabiston, Aurora, Ontario, Canada, assignors to Hart Manufacturing (Canada) Limited, Aurora, Ontario, Canada Application December 2, 1954, Serial No. 472,706

1 Claim. (Cl. 219—38)

This invention relates to a self-controlled thermostat electrical heating unit of the immersion type for use in water tanks and the like.

According to present practice in the immersion heating of hot water tanks, separate thermostat devices are mounted near the top and bottom of the tank, the upper thermostat being adapted to cause the upper regions of the tank to be heated first to a predetermined temperature and thereafter to switch the heating current to the lower thermostat to cause heating of the lower regions of the tank again to a predetermined temperature as determined by the lower thermostat.

The hot water heating installation according to prior techniques as above discussed, may involve a considerable amount of connecting wiring to be understaken upon the installation of the tank and heating unit whereby immersion heating elements and their respective thermostats are connected and the thermostats are also inter-connected. The upper thermostat is generally referred to in the trade as a "swing-over" type.

Heretofore, this class of thermostat has embodied a plurality of rigidly supported switching contacts associated with a thermo-responsive member adapted to actuate a switching arm of the snap action type and which may be adjustably biased in its movement by the thermo-responsive member for a predetermined temperature actuation toward one or the other of said switching contacts.

It is the main object of the present invention to provide an immersion heating unit which in its construction, embodies in association therewith, an improved form of thermostat device and which is adapted to be connected to a hot water tank by simplified wiring connections.

Other objects of the invention will be appreciated by a study of the following specification taken in conjunction with the accompanying drawings.

In the drawings:

Figure 3 is a plan view of a preferred form of thermostat device according to the invention;

Figure 4 is an elevation of the device of Figure 3; and

Figure 5 is a right-hand end view of the device of Figure 4.

Figure 1:
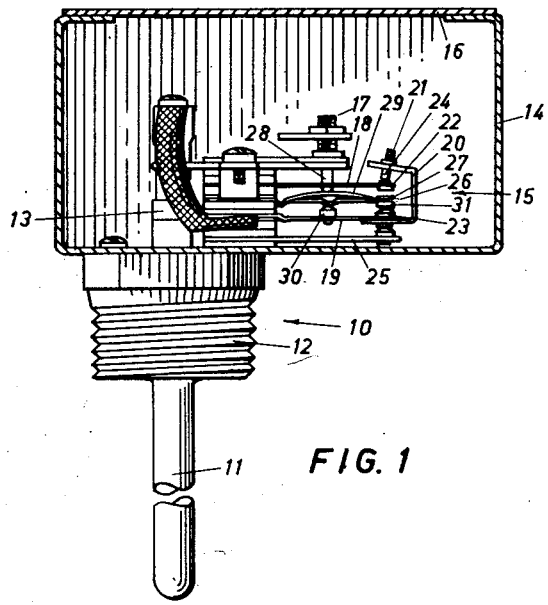
Figure 1 is a sectional view of the thermostatically controlled immersion heating assembly according to the invention.

Referring to the drawings, the thermostat controlled immersion heater assembly of the invention is generally indicated by numeral 10 on Figure 1 and embodies the immersion heating element 11 extending from the screw fitting 12 and carrying electrical connecting posts 13 extending into the thermostat housing 14. The adjustable single pole double throw thermostat device 15 is thermally and structurally connected to the fitting 12 by means of a metal screw or bolt (not shown). A cover plate 16 serves as an enclosure for the housing 14 and embodies openings (not shown) for adjustment of the adjusting screw 17 and for communication of connecting wiring therethrough.

In the form illustrated in Figure 1, the single pole double throw swing type thermostat 15 is of an improved form wherein resilient switch contact arms 18 and 19 are adjustable in their spaced apart relation by the adjusting element 20 fixed to the end of arm 19 and carrying the adjusting screw 21 adapted to position the contact 22 relative to contact 23, the projecting portion 24 of screw 21 being formed of an insulating material.

A thermal responsive member in the form of a bimetal arm 25 is adapted to bend upwardly on heating to move arm 19 therewith along with adjusting element 20. In this action, the arm 18 normally biased under the spring action of the material thereof in the upward direction, follows the upward motion to maintain engagement with the lower portion 24 of the adjusting screw 21.

The switching arm 26 is of a known form, being slit longitudinally and indented suitably substantially as shown, to provide a snap action upon being urged upwardly by upward motion of the arm 19 whereupon it quickly snaps to a position causing its contact button 27 to engage contact 22. A supporting member 30 on arm 19 assists in determining snap biasing tension in arm 26.

The temperature adjusting screw 17 connects to the downwardly extending adjustment member 28 adapted to engage a flexing portion 29 of switch arm 26 to adjustably tension the flexing portion to control the position at which snap action thereof occurs to effect switching motion for engagement of contact 27 with contact 22. In the form of switch arm 26 illustrated, the flexing portion 29 may flex toward the underside of the arm 26 upon engagement of contact 27 with contact 22 whereby it comes into engagement with supporting button 30 on arm 19. It will be apparent that as the thermostat arm 25 allows a lowering of contact arms 18 and 19, the flexing portion 29 will come under increased pressure from the supporting button 30 until reflexure is accomplished to the position illustrated in Figure 1. The switching arm snaps to the position shown therein at which a contact 31 is in engagement with the contact 23.

Figure 2:
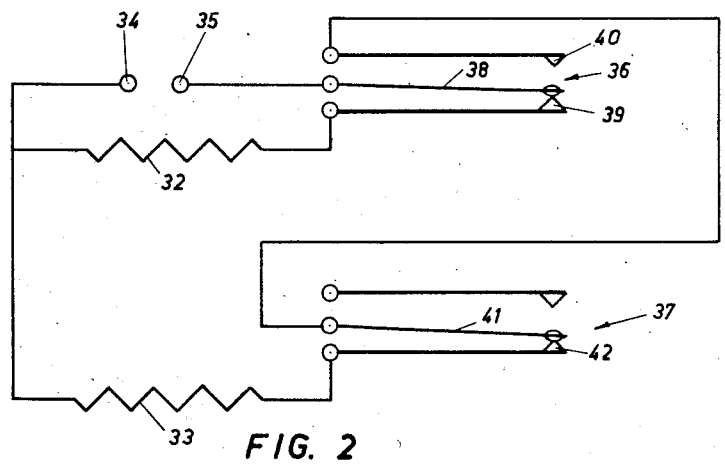
Figure 2 is an electric schematic of the installation of two heating assemblies of the invention in a hot water tank.

The above discussed switching function is employed in the manner generally illustrated in Figure 2 for controlling the heating of water in a hot water tank. As an example, conventional immersion heating elements 32 and 33 located respectively near the top and bottom of a water tank, are connected electrically in parallel to a source of electrical current entering terminals 34 and 35. The parallel electrical connection is controllably accomplished by the associated thermostat switching devices 36 and 37 respectively. In the arrangement shown, the upper heating element is initially connected for supply of current thereto by engagement of switch arm 38 with the contact 39 when the water in the upper regions of the tank approaches a temperature which, upon communication to the thermo-responsive element causes the switch arm 38 to move into electrical engagement with the contact 40 thereby disconnecting the heating element 32 and electrically connecting the heating element 33 in circuit through the switching arm 41 and contact 42. Again, upon heating of the thermal responsive member 25 associated with switching arm 41, the latter will be caused to disconnect from the contact 42. In this way, the heating of the water in the upper regions of the hot water tank is first accomplished whereby substantially immediate hot water demand may be met.

A preferred form of adjustable single pole double throw swing type thermostat is illustrated in Figures 3 to 5 and comprises a stack of switching components formed by mounting the bimetal arm 43 on the centrally bored mounting bushing 44. An insulating ring is set over the bushing and carries a resilient contact arm 45 and thereunder the electrical contact strip 46. An insulating washer 47 supports the switch arm 48 and terminal arm 49. Terminal arm 49 is in electrical contact with switching arm 48. A further insulating washer 50 supports the terminal arm 51 carrying thereover the contact arm 52, the latter carrying thereover, a further insulating washer 53 supporting the mounting plate 54 and held in assembly therewith by a flange end portion 55 provided by flaring of the outer end of sleeve portion 56 of bushing 44. A metal support plate 57 is held in assembly over the mounting plate 54 by the flange formation 55 of sleeve 56 thereby holding the complete stack of components in assembly. The bore 58 of bushing 44 is adapted to accommodate a mounting bolt whereby the thermostat unit may be fastened to a fitting such as the fitting 12 of the heating element 11 of Figure 1.

While the general arrangement of thermostat construction is substantially of the form illustrated in Figure 1, the form shown in Figures 3 to 5 embodies a modified construction of snap acting switch arm 48 in that the portion 59 thereof is held relatively firmly between the downwardly and upwardly movable adjusting member 60 and the supporting member 61 on contact arm 62. The side portions 63 of arm 48 are indented as at 64 to provide snap action in association with a portion 59 according to controllable positioning of the latter under adjusting movement of the member 60 by adjusting screw 65 mounted in the support plate 57 and carrying the indicator 66 adapted to traverse the temperature scale markings 67. As before, the contacts 68 and 69 respectively on arms 70 and 62, are adjusted in predetermined spaced apart relation by adjusting screw 71 adapted to move adjusting member 72 against arm 70. The screw 71 is mounted in threaded bushing 73 on the U-shaped rigid arm 74 fastened to the free end of contact arm 62 as at 75 by spot welding or the like.

Bimetal arm 43, upon heating, moves the actuating button 76 on the free end thereof, upwardly to cause the contact arms 70 and 62 and contacts thereon to move upwardly therewith.

As shown in Figure 4, the switching contact 77 on switch arm 63 is initially in engagement with contact 78 of arm 69 and upon being moved upwardly therewith under action of distortion of bimetal arm 43, reaches a point determined by the adjustment of adjusting member 60 at which it snaps upwardly to a position causing engagement of the contact 79 thereof with contact 68 on contact arm 52.

Adjustment of adjusting member 60 effects adjustable biasing tension in the switching arm. It is to be noted, however, that the support button 61 is maintained substantially in contact with the portion 59 of switching arm 48 whereby a much closer control of snap acting adjusting is accomplished.

What we claim as our invention is,

A self-controlled heating unit for a tank comprising in combination: a heating element for said tank; a supporting fitting for said element rigidly and thermally connected thereto and adapted to fasten said element to said tank; a single pole double throw thermostatic switch device formed of a stack of switching elements; a heat conducting bushing for retaining said stack in assembly; a switch actuating thermal responsive member forming a part of said assembly and in direct thermal contact with said bushing, said thermal responsive member having energizing and de-energizing positions; means supporting said switch device on said fitting to dispose the latter between said heating element and said switch device and providing direct thermal connection of said bushing and said heating element through said fitting; electrical leads connecting said heating element electrically in circuit with said switch device for control by the latter; a contact in said switch device adapted to be energized responsive to a de-energized positioning of said thermal responsive member; and terminal means on said switch device adapted for electrical connection of said contact in a dual heating circuit.

References Cited in the file of this patent

UNITED STATES PATENTS

| | | |
|---|---|---|
| 1,892,557 | McCormick | Dec. 27, 1932 |
| 1,930,551 | Blashfield | Oct. 17, 1933 |
| 2,446,555 | Sage | Aug. 10, 1948 |
| 2,606,271 | Morris | Aug. 5, 1952 |
| 2,692,317 | Bletz | Oct. 19, 1954 |